US011160315B2

(12) United States Patent
Wang et al.

(10) Patent No.: US 11,160,315 B2
(45) Date of Patent: Nov. 2, 2021

(54) COMPRESSION CHARGING DEVICE

(71) Applicant: CHINA TOBACCO YUNNAN INDUSTRIAL CO., LTD, Kunming (CN)

(72) Inventors: Ru Wang, Kunming (CN); Chengya Wang, Kunming (CN); Xu Zeng, Kunming (CN); Jingmei Han, Kunming (CN); Ping Lei, Kunming (CN); Shanzhai Shang, Kunming (CN); Zhiqiang Li, Kunming (CN); Dalin Yuan, Kunming (CN); Changshan Zhao, Kunming (CN); Shiwei Li, Kunming (CN); Yongkuan Chen, Kunming (CN); Hongyong Luo, Kunming (CN); Fengren Fang, Kunming (CN)

(73) Assignee: CHINA TOBACCO YUNNAN INDUSTRIAL CO., LTD, Kunming (CN)

( * ) Notice: Subject to any disclaimer, the term of this patent is extended or adjusted under 35 U.S.C. 154(b) by 335 days.

(21) Appl. No.: 16/341,451

(22) PCT Filed: Oct. 17, 2017

(86) PCT No.: PCT/CN2017/106531
§ 371 (c)(1),
(2) Date: Apr. 12, 2019

(87) PCT Pub. No.: WO2018/072681
PCT Pub. Date: Apr. 26, 2018

(65) Prior Publication Data
US 2019/0267823 A1    Aug. 29, 2019

(30) Foreign Application Priority Data

Oct. 18, 2016    (CN) .......................... 201610905471.6

(51) Int. Cl.
*A24F 40/95*    (2020.01)
*A24F 9/16*    (2006.01)
*H02J 7/00*    (2006.01)

(52) U.S. Cl.
CPC ............... *A24F 40/95* (2020.01); *A24F 9/16* (2013.01); *H02J 7/0045* (2013.01)

(58) Field of Classification Search
CPC .................................. A24F 9/16; A24F 40/95
See application file for complete search history.

(56) References Cited

U.S. PATENT DOCUMENTS 10,149,497 B2 *  12/2018  Memari ................. H02J 7/0042
10,218,193 B2 *   2/2019  Gratton ............... H01M 10/446
(Continued)

FOREIGN PATENT DOCUMENTS

CN       203424298 U      2/2014
CN       204812050 U     12/2015
(Continued)

*Primary Examiner* — Jean F Duverne
(74) *Attorney, Agent, or Firm* — Bayramoglu Law Offices LLC

(57) ABSTRACT

A compression charging device includes a cigarette case charging part and a cigarette set charging part. The cigarette case charging part includes a positive electrode cover, a positive spring, a negative spring, a charging insulation sleeve, and a PCB. The cigarette set charging part includes a filter holding seat, a charging base, and an insulation fixing sleeve. The compression charging device is configured for cigarette set charging. The negative spring and the positive spring have a double function of electrical conduction and bouncing.

5 Claims, 2 Drawing Sheets

(56) References Cited

U.S. PATENT DOCUMENTS

| | | | |
|---|---|---|---|
| 10,433,584 B2* | 10/2019 | Nettenstrom | B65D 25/10 |
| 10,701,976 B2* | 7/2020 | Verleur | A24F 40/42 |
| 2017/0208865 A1* | 7/2017 | Nettenstrom | A24F 40/95 |

FOREIGN PATENT DOCUMENTS

| | | |
|---|---|---|
| CN | 206117234 U | 4/2017 |
| CN | 106655327 A | 5/2017 |

* cited by examiner

COMPRESSION CHARGING DEVICE

CROSS REFERENCE TO THE RELATED APPLICATIONS

This application is the national phase entry of International Application No. PCT/CN2017/106531, filed on Oct. 17, 2017, which is based upon and claims priority to Chinese Patent Application No. 201610905471.6, filed on Oct. 18, 2016, the entire contents of which are incorporated herein by reference.

TECHNICAL FIELD

The present invention belongs to the field of electronic cigarette, specifically relates to a compression charging device.

BACKGROUND

The existing charging devices for cigarette case are point-contact charging devices. Positive contacts and negative contacts are respectively led out from the Print Circuit Board (PCB) of a cigarette case and an end surface of a cigarette set. When the cigarette case is closed, an elastic body inside the cigarette case compresses the cigarette set, so that the positive and negative contacts on a contact surface of the cigarette set and the cigarette case completely contact each other for charging.

SUMMARY

Based on the existing point-contact charging device for cigarette case, a compression charging device is developed in the present invention. The compression charging device includes a cigarette case charging part and a cigarette set charging part.

The cigarette case charging part includes a positive electrode cover 1, wherein the positive electrode cover 1 includes a cylindrical upper portion and a drum-shaped lower portion; a positive electrode column 2, wherein the positive electrode column 2 includes an upper portion located inside the drum-shaped lower portion of the positive electrode cover 1; a positive spring 6, wherein the positive spring 6 is located inside a spring cap 3, the positive spring 6 has an upper portion connected to a lower surface of the positive electrode column 2 and a lower portion connected to a charging spring seat 4, and the charging spring seat 4 is connected to a positive electrode of a power supply of a cigarette case; a negative spring 5 connected to a negative electrode of the power supply of the cigarette case; a charging insulation sleeve 7 located between the charging spring seat 4 and the negative spring 5; and a PCB 8, wherein the PCB is connected to the charging spring seat 4, the negative spring 5, and the charging insulation sleeve 7.

The cigarette set charging part includes a filter holding seat 9 connected to a positive electrode of the cigarette set, wherein an overall structure of the filter holding seat 9 is drum-shaped, and a lower surface of the filter holding seat 9 is matched with the positive electrode cover 1; a charging base 11 connected to a negative electrode of the cigarette set, wherein an overall structure of the charging base 11 is drum-shaped, and a lower surface of the charging base 11 is matched with an upper surface of the negative spring 5; and an insulation fixing sleeve 10 located between the filter holding seat 9 and the charging base 11.

Preferably, the charging spring seat 4 and the negative spring 5 are connected to the PCB 8 by a stannum solder.

Preferably, the positive electrode cover 1 is connected to the positive electrode column 2 through a press riveting.

Preferably, the spring cap 3 is connected to the charging spring seat 4 through a press riveting.

Preferably, the lower portion of the positive electrode cover 1 extends into the spring cap 3, and an inner protrusion edge on an upper portion of the spring cap 3 is matched with an outer protrusion edge on a lower portion of the positive electrode cover 1.

The working principle of the compression charging device of the present invention is as follows.

The charging spring seat 4 and the negative spring 5 of the cigarette case are separated from each other through the charging insulation sleeve 7, and are respectively connected to the positive and negative electrodes. The PCB 8 is respectively connected to the negative spring 5 and the charging spring seat 4 through stannum solder. The filter holding seat 9 of the cigarette set is separated from the charging base 11 through the insulation fixing sleeve 10, and the filter holding seat 9 and the charging base 11 are respectively connected to the positive and negative electrodes.

When the cigarette set is placed into the cigarette case, the cigarette case cover compresses the cigarette set. The filter holding seat 9 of the cigarette set contacts the surface of the positive electrode cover 1 of the cigarette case, and the positive electrode cover 1 is connected to the positive electrode column 2 through the press riveting. The positive electrode column 2 and the positive spring 6 are put into the charging spring seat 4, and connected to the charging spring seat 4 through the spring cap 3 by press riveting. The positive spring 6 is in a compression state, and the positive electrode of the cigarette set is in an electrical connection to the cigarette case. The charging base 11 of the cigarette set contacts and tightly compresses the surface of the negative spring 5, and the negative electrode of the cigarette set is in an electrical connection to the cigarette case, so the cigarette set gets charged.

When the cigarette case is opened, the cigarette set is bounced by the negative spring 6 of the cigarette case, the filter holding seat 9 of the cigarette set is separated from the surface of the positive electrode cover 1, the positive electrode of the cigarette set is not in an electrical connection to the cigarette case, and the cigarette set can be taken out from the cigarette case.

The present invention has the following advantages.

Based on the existing point-contact charging device, a compression charging device for cigarette set to get charged is firstly developed in the present invention. The negative spring and the positive spring have a double function of electrical conduction and bouncing.

Figure 1:
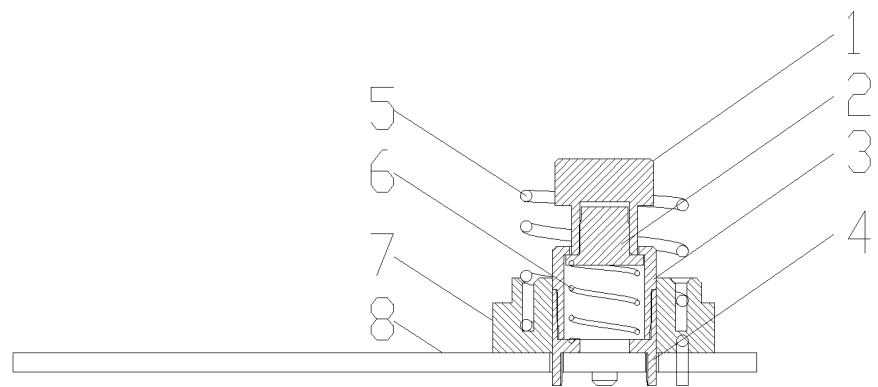
FIG. 1 is a schematic diagram of a cigarette case charging part of the present invention.
Figure 2:
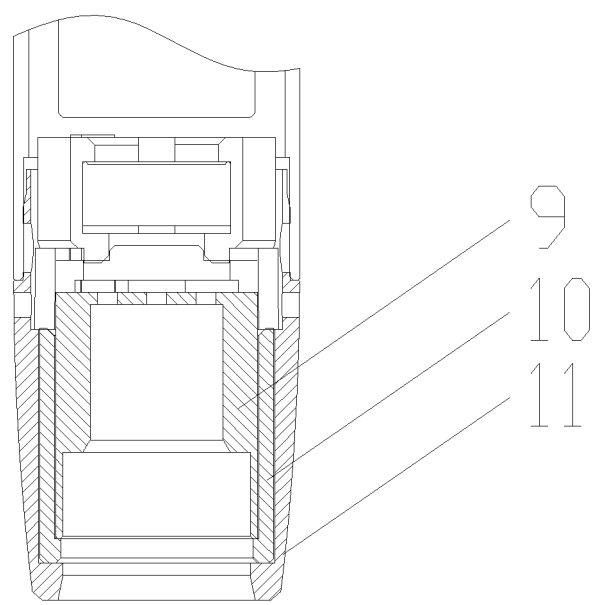
FIG. 2 is a schematic diagram of a cigarette set charging part of the present invention.
Figure 3:
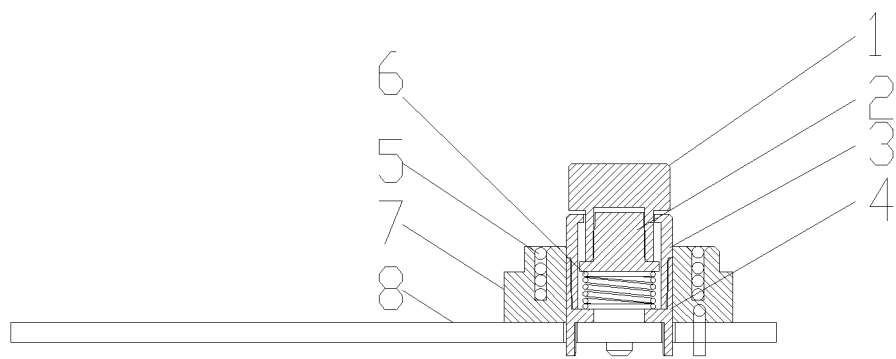
FIG. 3 is schematic diagram showing a compression state (charging state) of a cigarette case charging part of the present invention.

The reference designators in the drawings are described below: 1—positive electrode cover; 2—positive electrode column; 3—spring cap; 4—charging spring seat; 5—negative spring; 6—positive spring; 7—charging insulation sleeve; 8—PCB; 9—filter holding seat; 10—insulation fixing sleeve; 11—charging base.

DETAILED DESCRIPTION OF THE EMBODIMENTS

When the cigarette set is placed into the cigarette case, the cigarette case cover compresses the cigarette set. The filter holding seat 9 of the cigarette set contacts the surface of the positive electrode cover 1, and the positive electrode cover 1 is connected to the positive electrode column 2 through the press riveting. The positive electrode column 2 and the positive spring 6 are put into the charging spring seat 4, and connected to the charging spring seat 4 through the spring cap 3 by press riveting. The positive spring 6 is in a compression state, and the positive electrode of the cigarette set is in an electrical connection to the cigarette case. The charging base 11 of the cigarette set tightly compresses the negative spring 5 of the cigarette case, the negative electrode of the cigarette set is in an electrical connection to the cigarette case, so as to make the cigarette set get charged.

When the cigarette case is opened, the cigarette set is bounced by the negative spring 6 of the cigarette case, the filter holding seat 9 of the cigarette set is separated from the surface of the positive electrode cover 1, the positive electrode of the cigarette set is not in an electrical connection to the cigarette case, and the cigarette set can be taken out from the cigarette case.

What is claimed is:

1. A compression charging device, comprising a cigarette case charging part and a cigarette set charging part; wherein
    the cigarette case charging part comprises a positive electrode cover, wherein the positive electrode cover comprises a cylindrical upper portion and a drum-shaped lower portion; a positive electrode column, wherein an upper portion of the positive electrode column is located inside the drum-shaped lower portion of the positive electrode cover; a positive spring, wherein the positive spring is located inside a spring cap, an upper portion of the positive spring is connected to a lower surface of the positive electrode column, a lower portion of the positive spring is connected to a charging spring seat, and the charging spring seat is connected to a positive electrode of a power supply of a cigarette case; a negative spring connected to a negative electrode of the power supply of the cigarette case; a charging insulation sleeve located between the charging spring seat and the negative spring; and a PCB connected to the charging spring seat, the negative spring, and the charging insulation sleeve; and
    the cigarette set charging part comprises a filter holding seat, wherein the filter holding seat is connected to a positive electrode of a cigarette set, an overall structure of the filter holding seat is drum-shaped, and a lower surface of the filter holding seat is matched with the positive electrode cover; a charging base, wherein the charging base is connected to a negative electrode of the cigarette set, an overall structure of the charging base is drum-shaped, and a lower surface of the charging base is matched with an upper surface of the negative spring; and an insulation fixing sleeve located between the filter holding seat and the charging base.

2. The compression charging device of claim 1, wherein the charging spring seat and the negative spring are connected to the PCB by a stannum solder.

3. The compression charging device of claim 1, wherein the positive electrode cover is connected to the positive electrode column through a press riveting.

4. The compression charging device of claim 1, wherein the spring cap is connected to the charging spring seat through a press riveting.

5. The compression charging device of claim 1, wherein the drum-shaped lower portion of the positive electrode cover extends into the spring cap, and an inner protrusion edge on an upper portion of the spring cap is matched with an outer protrusion edge on the drum-shaped lower portion of the positive electrode cover.

* * * * *